United States Patent [19]

Chen

[11] Patent Number: 4,953,431

[45] Date of Patent: Sep. 4, 1990

[54] SAW BLADE SUSPENSION DEVICE

[76] Inventor: Ruey-Zon Chen, 18, Lane 144, Tucheng Rd., Tali Hsiang, Taichung Hsien, Taiwan

[21] Appl. No.: 276,625

[22] Filed: Nov. 28, 1988

[51] Int. Cl.[5] .............................................. B27B 19/02
[52] U.S. Cl. ....................................... 83/781; 30/393; 83/783; 83/699
[58] Field of Search ........................... 83/781, 783–786, 83/698, 699; 30/392–394

[56]  References Cited

U.S. PATENT DOCUMENTS

| | | | |
|---|---|---|---|
| 2,780,249 | 2/1957 | Andreae et al. | 83/781 |
| 4,616,541 | 10/1986 | Eccardt et al. | 83/782 X |
| 4,670,986 | 6/1987 | Chen | 83/698 X |
| 4,841,823 | 6/1989 | Brundage | 83/781 |

Primary Examiner—Hien H. Phan
Attorney, Agent, or Firm—Bucknam and Archer

[57]  ABSTRACT

The improved saw blade suspension device permits adjustment at an angle between (1) 0°–90°; (2) 90°–180°; and (3) 180°–270°. This constitutes a substantial improvement because it permits adjustment according to different directions of the saw blade, and according to each operator who may be left-handed or right-handed. Two clamping sheets are used and only one pin is required for each clamping sheet. The device comprises an upper body and a lower body (1), the upper and lower body having a pair of ears (12), the upper and lower body having at one end a portion (13), holes (14, 15, 16 and 17) located in the front, right side, left side and the rear, a steel pin (11) inserted in the ears (12) through apertures (121, 122). The saw blade (3) is inserted in the holes (14, 17) or holes (15 and 16) and is locked by screws (19), into two holes (18) each of which is located at one end of the body (1). The device also comprises a pair of clamping sheets (2) for clipping the steel pin, each of the clamping sheets having in front a plate (21) with protruberance (22). The plate (21) has a width equal to the distance between the two ears (12), and pin (11) is clipped by said clipping plate (21).

3 Claims, 3 Drawing Sheets

SAW BLADE SUSPENSION DEVICE

The present invention relates to an improved saw blade suspension device.

In my U.S. Pat. No. 4,670,986, there is described a saw blade suspension device particularly suitable for a scroll-saw. Although this device has proved to be satisfactory, I have now found that the device may be considerably simplified, strengthened and be made more accurate.

SUMMARY OF THE INVENTION

While with the device of U.S. Pat. No. 4,670,986, the blade may be adjusted only at an angle between 0° and 180°, the device of the present application permits adjustment at an angle between (1) 0°-90°; (2) 90°-180°; and (3) 180°-270°. This constitutes a substantial improvement because it permits adjustment according to different directions of the saw blade, and according to each operator who may be left-handed or right-handed. Two clamping sheets are used and only one pin is required for each clamping sheet.

By reference to FIGS. 1, 2, 8, 9, 10 and 11, the suspension device comprises the main body 1 and clamping member 2 which is a C-shaped sheet. Numeral 11 is the steel pin used to clip the body 1 to the clamping sheet. The blade 3 is held between two bodies 1.

Figure 1:
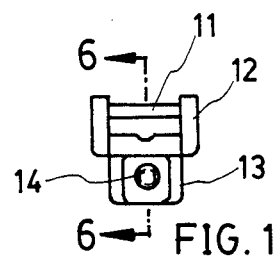
FIG. 1 is a front elevational view of the main body of the device.
Figures 3, 6:
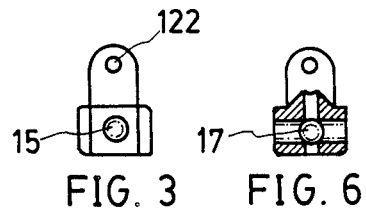
FIG. 3 is a right side view of the main body.
FIG. 6 is a sectional view along line 6—6 in FIG. 1.
Figure 5:
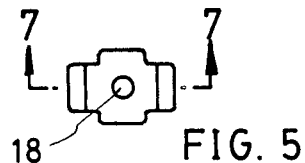
FIG. 5 is a bottom view of the main body.
Figure 7:
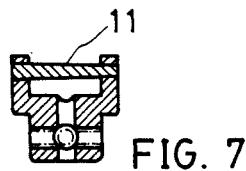
FIG. 7 is a sectional view along line 7—7, in FIG. 5.

As shown in FIG. 1, the body 1 is provided with a pair of ears 12. The steel pin 11 penetrates the two ears 12. Numeral 13 designates the lower part of body 1. The two bodies 1, when the device is assembled are arranged in such a manner that the ears open outwardly to make contact with the clamping sheets 2, both at the top and at the bottom. On the contrary, in the device according to U.S. Pat. No. 4,670,986 the ears opened inwardly both at the top and at the bottom.

Figure 2:
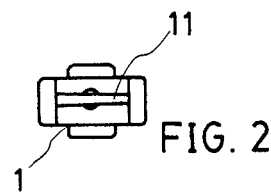
FIG. 2 is a top view of the main body.
Figure 4:
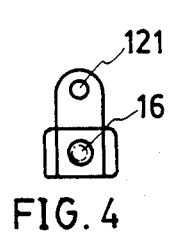
FIG. 4 is a left side view of the main body.

As shown in FIGS. 1, 4, 5 and 6, numerals 14, 15, 16 and 17 designate holes formed in the front, right side, left side and the rear of body 13. Numeral 18 is a hole formed in the upper and lower portions of body 1, to hold the saw blade 3. The steel pin 11 is larger on one side than on the other side. The two holes 121 and 122 shown in FIGS. 3 and 4 are formed in the ears 12. Hole 121 is bigger than hole 122 so that the steel pin may be easily inserted and fixed on the ears 12. The pin when the device is assembled is under tension.

The saw blade 3 is inserted into the hole 18 and is locked in place by concave-head or set screw 19 which is inserted into holes 14 and 17, or holes 15 and 16 on the left or right side.

When it is necessary to change the angle of adjustment of the blade, it is sufficient to unscrew the concave-head screws 19, turn the blade 3 and then tighten again the concave head screws 19, to lock the blade.

Figure 8:
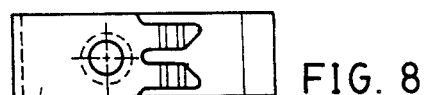
FIG. 8 is a top view of the clamping sheet.
Figure 9:
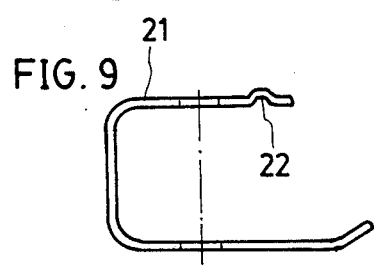
FIG. 9 is a front view of the clamping sheet.
Figure 10:
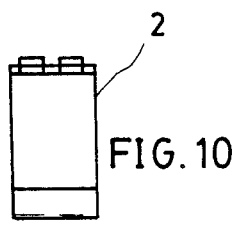
FIG. 10 is a right side view of the clamping sheet.
Figures 8A, 8B:
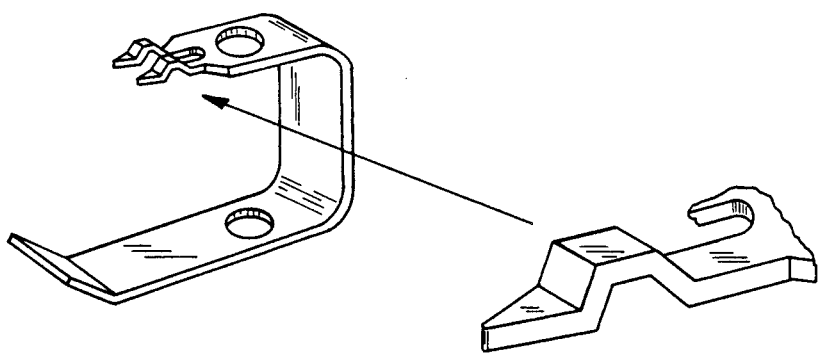
FIG. 8A is a side view in perspective of the clamping sheet.
FIG. 8B illustrates a portion of the clamping sheet.
Figure 11:
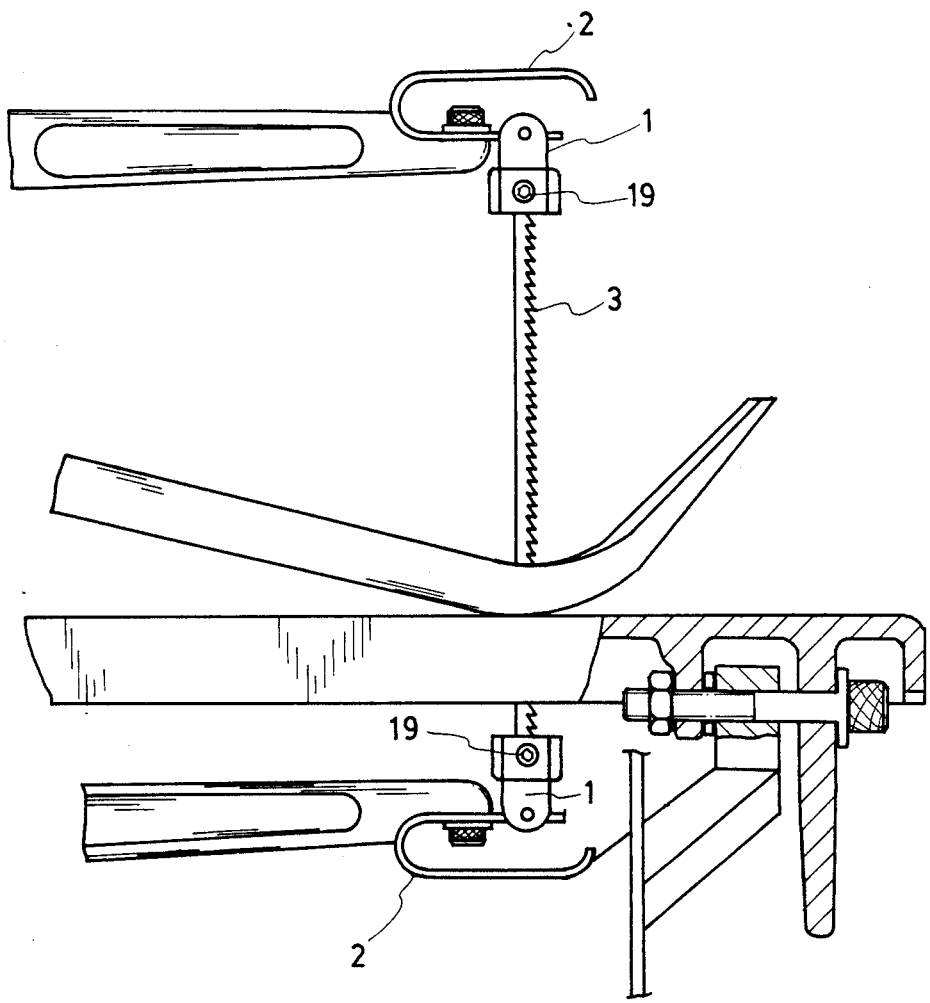
FIG. 11 illustrates the blade with the suspension device, including the clamping member.

FIGS. 8, 9 and 10 illustrate the clamping sheet 2. As shown in FIG. 11, two clamping sheets are used. The clamping sheet is made of flexible plate C-shaped. The clipping arm 21 which has both sides tapered, is located on the front of clamping sheet 2.

The width of the clipping plate 21 is almost equal to the distance between the two ears 12 of the body 1. The clipping plate 21 is inserted between them. Then the protruberance 22 on the clipping plate 21 clips on the steel pin on body 1. In other words, when the clamping sheet 2 moves up and down controlled by the suspension arm, the clamping sheet 2 can drive body 1 with elasticity due to the clamping sheet 2. Thus the clamping sheet 2 adjusts itself to the body 1 and to the saw blade 3. If the saw blade must be repaired, the body 1 may be easily removed from clipping plate 21 and the blade may be replaced.

Several advantages result from the improved saw blade suspension device of the present invention. The saw blade may be adjusted at different angles. The clamping sheets are easy to make and assemble. The position of the steel pin may be changed and only one steel pin is required for each body 1.

What is claimed is:

1. A saw blade suspension device for a scroll saw, comprising a saw blade (3) having a pair of end portions, means for supporting the saw blade (3) at both end portions thereof, said means comprising an upper body and a lower body (1), each of said upper and lower bodies having a pair of ears (12) protruding outwardly, each of said upper and lower bodies having a bottom portion (13), a pair of holes (14,17) located in the front and rear of said bottom portion, a second pair of holes (15,16) located in the left and right side of said bottom portion, a steel pin (11) inserted in said ears of each body through apertures (121, 122) formed in said ears, the saw blade (3) being inserted in said first pair of holes (14, 17) located in the front and the rear of said bottom portion or in the second pair of said holes (15,16) located in the left and right side of said bottom portion, each body (1) having a hole (18) in the center of the bottom portion, the holes of said first pair (14, 17) and the holes of said second pair (15, 16) intersecting said hole (18) located in the center of the bottom portion, said saw blade being held in said holes (18) located in the center of said bottom portion of each of said bodies and being locked by screws (19), a pair of clamping sheets (2) engaging said ears for clipping said steel pin, each of said clamping sheets having a front a plate (21) with a protruberance (22), said plate (21) having a width equal to the distance between said two ears (12), said pin (11) being clipped by said clipping plate (21).

2. The suspension device according to claim 1 wherein said clamping sheets are C-shaped.

3. The device according to claim 1 wherein said pin has one end larger than the other and one of said apertures (121, 122) is larger than the other.

* * * * *